(12) United States Patent
Adachi et al.

(10) Patent No.: US 9,950,314 B2
(45) Date of Patent: Apr. 24, 2018

(54) METHOD FOR PRODUCING FINE CATALYST PARTICLES AND METHOD FOR PRODUCING CARBON-SUPPORTED CATALYST

(71) Applicant: TOYOTA JIDOSHA KABUSHIKI KAISHA, Toyota-shi, Aichi-ken (JP)

(72) Inventors: Makoto Adachi, Susono (JP); Naoki Takehiro, Shizuoka-ken (JP); Keiichi Kaneko, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/303,877

(22) PCT Filed: Apr. 3, 2015

(86) PCT No.: PCT/JP2015/060632
§ 371 (c)(1),
(2) Date: Oct. 13, 2016

(87) PCT Pub. No.: WO2015/159741
PCT Pub. Date: Oct. 22, 2015

(65) Prior Publication Data
US 2017/0028385 A1 Feb. 2, 2017

(30) Foreign Application Priority Data
Apr. 18, 2014 (JP) .................. 2014-086244

(51) Int. Cl.
*H01M 4/88* (2006.01)
*B01J 23/44* (2006.01)
(Continued)

(52) U.S. Cl.
CPC ............. *B01J 23/44* (2013.01); *B01J 35/02* (2013.01); *B01J 35/026* (2013.01); *B01J 37/02* (2013.01);
(Continued)

(58) Field of Classification Search
CPC .................. H01M 4/8853; H01M 4/925
See application file for complete search history.

(56) References Cited

U.S. PATENT DOCUMENTS

| 2007/0031722 A1 | 2/2007 | Adzic et al. |
| 2010/0177462 A1 | 7/2010 | Adzic et al. |

(Continued)

FOREIGN PATENT DOCUMENTS

| JP | 2011-181383 A | 9/2011 |
| JP | 2011-526655 A | 10/2011 |
| WO | 2010/005773 A1 | 1/2010 |

*Primary Examiner* — Bryan D. Ripa
(74) *Attorney, Agent, or Firm* — Andrews Kurth Kenyon LLP

(57) ABSTRACT

The present invention is to provide fine catalyst particles to which sulfate ions are less likely to be adsorbed, and a carbon-supported catalyst to which sulfate ions are less likely to be adsorbed. Disclosed is a method for producing fine catalyst particles comprising a fine palladium-containing particle and a platinum-containing outermost layer covering at least part of the fine palladium-containing particle, wherein the method comprises: a copper covering step of covering at least part of the fine palladium-containing particle with copper by preparing a second dispersion by mixing a first dispersion comprising fine palladium-containing particles being dispersed in an acid solution with a copper-containing solution, and applying a potential that is nobler than the oxidation reduction potential of copper to the fine palladium-containing particles in the second dispersion, and a platinum covering step of covering at least part of the fine palladium-containing particle with platinum by substi- (Continued)

tuting the copper covering at least part of the fine palladium-containing particle with platinum by mixing the second dispersion and a platinum-containing solution after the copper covering step, with applying a constant potential that is in a range between a potential that is nobler than the oxidation reduction potential of copper and a potential that is less than the oxidation reduction potential of platinum, to the fine palladium-containing particles.

3 Claims, 8 Drawing Sheets

(51) Int. Cl.
- B01J 37/04 (2006.01)
- B01J 35/02 (2006.01)
- B01J 37/02 (2006.01)
- H01M 4/92 (2006.01)

(52) U.S. Cl.
CPC ........... *B01J 37/0221* (2013.01); *B01J 37/04* (2013.01); *H01M 4/88* (2013.01); *H01M 4/8853* (2013.01); *H01M 4/92* (2013.01); *H01M 4/926* (2013.01)

(56) References Cited

U.S. PATENT DOCUMENTS

| | | | | |
|---|---|---|---|---|
| 2011/0155579 | A1* | 6/2011 | Wang | B01J 21/18 205/103 |
| 2012/0010069 | A1* | 1/2012 | Takehiro | B01J 13/02 502/5 |
| 2012/0245019 | A1* | 9/2012 | Adzic | B82Y 30/00 502/5 |
| 2013/0022899 | A1* | 1/2013 | Arai | C23C 18/31 429/524 |
| 2013/0324391 | A1* | 12/2013 | Shao | H01M 4/921 502/5 |
| 2015/0318560 | A1* | 11/2015 | Kaneko | H01M 4/8657 502/5 |

* cited by examiner

FIG. 6
Applied potential (high)
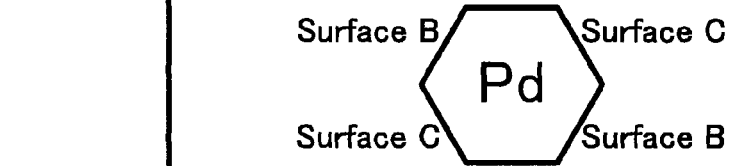
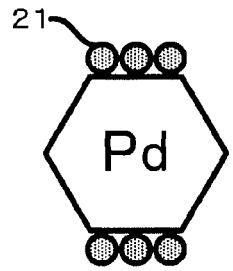
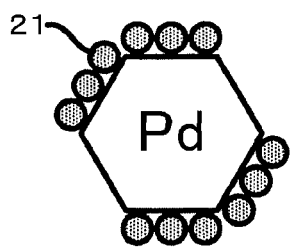
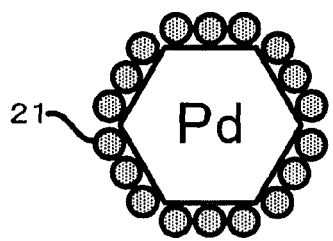
Applied potential (low)

FIG. 7
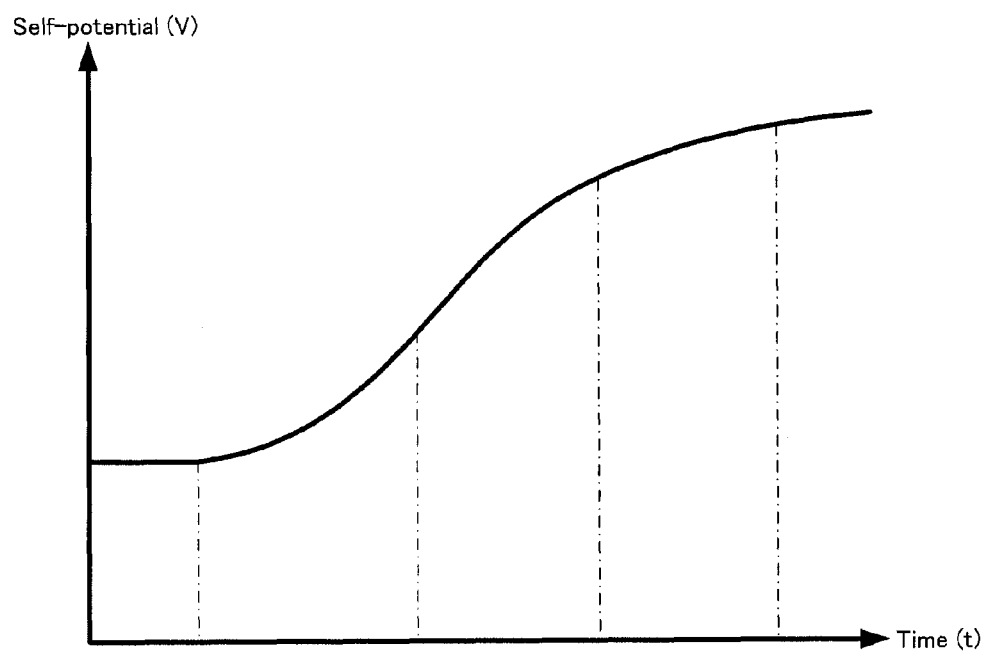
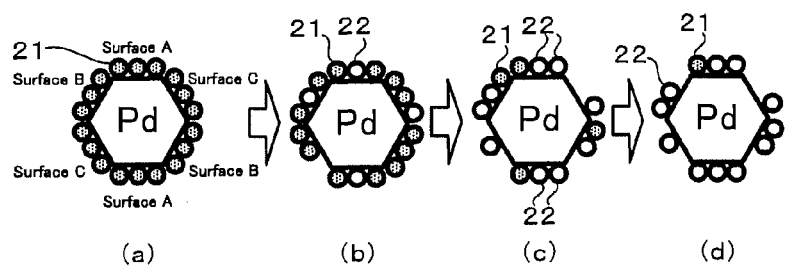
(a)     (b)     (c)     (d)

METHOD FOR PRODUCING FINE CATALYST PARTICLES AND METHOD FOR PRODUCING CARBON-SUPPORTED CATALYST

CROSS-REFERENCE TO RELATED APPLICATIONS

This is a national phase application based on the PCT International Patent Application No. PCT/JP2015/060632 filed Apr. 3, 2015, claiming priority to Japanese Patent Application No. 2014-086244 filed Apr. 18, 2014, the entire contents of both of which are incorporated herein by reference.

TECHNICAL FIELD

The present invention relates to a method for producing fine catalyst particles to which sulfate ions are less likely to be adsorbed, and a method for producing a carbon-supported catalyst to which sulfate ions are less likely to be adsorbed.

BACKGROUND ART

As an electrode catalyst for the anode and cathode of a fuel cell, a technique relating to fine catalyst particles is known, which have a structure that includes a core particle and an outermost layer covering the core particle (so-called "core-shell structure"). For the fine catalyst particles, the cost of the inside of the particles, which hardly participates in a catalyst reaction, can be reduced by the use of a relatively inexpensive material for the core particle.

A method for producing a core-shell catalyst is disclosed in Patent Document 1, in which a copper shell layer is produced by the Cu-underpotential deposition method (Cu-UPD) and then the copper shell layer is substituted with noble metal atoms.

CITATION LIST

Patent Document 1: U.S. Unexamined Patent Application Publication No. 2010/0177462

SUMMARY OF INVENTION

Technical Problem

In Patent Document 1, it is described that a copper monoatomic layer is formed on a core surface by Cu-UPD, and then the copper is substituted with platinum using a solution of $K_2PtCl_4$ dissolved in 50 mM $H_2SO_4$, the solution having a concentration of 50 mM. However, according to research studies made by the inventors of the present invention, it was found that when, like the invention of Patent Document 1, any potential treatment is not carried out at the time of platinum substitution, a core-shell catalyst that is likely to be poisoned by sulfate ions, is obtained.

The present invention was achieved in light of the above circumstance. An object of the present invention is to provide a method for producing fine catalyst particles to which sulfate ions are less likely to be adsorbed, and a method for producing a carbon-supported catalyst to which sulfate ions are less likely to be adsorbed.

Solution to Problem

The fine catalyst particle production method of the present invention is a method for producing fine catalyst particles comprising a fine palladium-containing particle and a platinum-containing outermost layer covering at least part of the fine palladium-containing particle, wherein the method comprises: a copper covering step of covering at least part of the fine palladium-containing particle with copper by preparing a second dispersion by mixing a first dispersion comprising fine palladium-containing particles being dispersed in an acid solution with a copper-containing solution, and applying a potential that is nobler than the oxidation reduction potential of copper to the fine palladium-containing particles in the second dispersion, and a platinum covering step of covering at least part of the fine palladium-containing particle with platinum by substituting the copper covering at least part of the fine palladium-containing particle with platinum by mixing the second dispersion and a platinum-containing solution after the copper covering step, with applying a constant potential that is in a range between a potential that is nobler than the oxidation reduction potential of copper and a potential that is less than the oxidation reduction potential of platinum, to the fine palladium-containing particles.

In the production method of the present invention, it is preferable that the second dispersion and the platinum-containing solution are mixed in the platinum covering step, with applying a constant potential that is in a range of from 0.37 to 0.70 V (vs. RHE) to the fine palladium-containing particles.

The carbon-supported catalyst production method of the present invention is a method for producing a carbon-supported catalyst in which the fine catalyst particles are supported on a carbon support, wherein fine palladium-containing particles configured for use in the copper covering step are supported on a carbon support.

Advantageous Effects of Invention

According to the present invention, by substituting the copper with the platinum with applying a constant potential in the platinum covering step, an increase in the potential of the fine palladium-containing particle, which is associated with platinum deposition, can be prevented, and natural oxidation of the copper can be inhibited. Therefore, the copper can be substituted with the platinum before the copper is desorbed from the fine palladium-containing particle surface, resulting in the formation of a platinum-containing outermost layer that has less defects than ever before. As a result, the area of the fine palladium-containing particles exposed on the fine catalyst particle surface is decreased, and fine catalyst particles to which sulfate ions are less likely to be adsorbed, can be produced.

BRIEF DESCRIPTION OF DRAWINGS

FIG. 6 is a schematic sectional view illustrating that the state of the fine palladium particle of being covered with copper is dependent on potential.

FIG. 7 is a graph of simulated changes in the self-potential of a fine palladium particle in a conventional platinum covering step.

DESCRIPTION OF EMBODIMENTS

Figure 1:
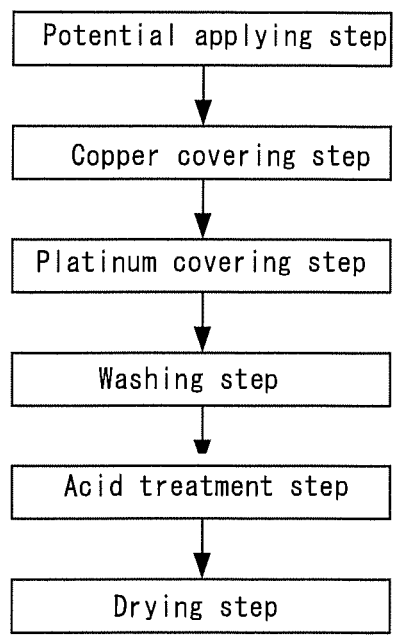
FIG. 1 is a flow chart of an example of the fine catalyst particle production method of the present invention.

The fine catalyst particle production method of the present invention is a method for producing fine catalyst particles comprising a fine palladium-containing particle and a platinum-containing outermost layer covering at least part of the fine palladium-containing particle, wherein the method comprises: a copper covering step of covering at least part of the fine palladium-containing particle with copper by preparing a second dispersion by mixing a first dispersion comprising fine palladium-containing particles being dispersed in an acid solution with a copper-containing solution, and applying a potential that is nobler than the oxidation reduction potential of copper to the fine palladium-containing particles in the second dispersion, and a platinum covering step of covering at least part of the fine palladium-containing particle with platinum by substituting the copper covering at least part of the fine palladium-containing particle with platinum by mixing the second dispersion and a platinum-containing solution after the copper covering step, with applying a constant potential that is in a range between a potential that is nobler than the oxidation reduction potential of copper and a potential that is less than the oxidation reduction potential of platinum, to the fine palladium-containing particles.

A core-shell catalyst in which a core is covered with a thin shell having catalytic activity, has a structure that is advantageous from the viewpoint of catalytic reaction. As a result, for example, in the case of a core-shell catalyst with a platinum shell, it is known that the oxygen reduction activity per platinum mass is about 3.5 times higher than conventional platinum catalysts. The oxygen reduction activity of a core-shell catalyst can be quantitatively confirmed by the rotating disk electrode method (the RDE method).

However, when a core-shell catalyst is used in a fuel cell, the oxygen reduction activity per platinum mass of the core-shell catalyst is only about twice that of a platinum catalyst, and the power generation performance increasing effect originally expected from the viewpoint of practical application, was not obtained.

As a reason for why the core-shell catalyst cannot make a practical power generation performance increasing effect, the inventors of the present invention focused on that the activity decrease rate of conventional core-shell catalysts in a fuel cell environment is faster than platinum catalysts.

In the oxygen reduction activity measurement by the RDE method, the amount of power generated by a potential sweep is measured, and the initial oxygen reduction activity of a catalyst is calculated. Meanwhile, in the evaluation of the power generation of a fuel cell, to measure the power generation performance in a stationary state at any given potential, the oxygen reduction activity of a catalyst being in a stationary state is calculated. Since the activity decline rate over time differs between a core-shell catalyst and a platinum catalyst, there is a gap between the activity in the beginning of the measurement (that is, the oxygen reduction activity measured by the RDE method) and the activity in the stationary state (that is, the oxygen reduction activity measured by the evaluation of the power generation of a fuel cell).

The activity decrease over time of a catalyst in a fuel cell (that is, a decrease in oxygen reduction reaction rate) is mainly caused by the following two factors.

(1) Oxidation of a platinum surface serving as a reaction site (2) Adsorption of sulfonic acid derived from an ionomer coexisting in the electrode catalyst layer of a fuel cell to a platinum surface serving as a reaction site Concerning the factor (1), the inventors of the present invention measured a core-shell catalyst and a platinum catalyst by the RDE method in the following conditions and examined their changes in the oxygen reduction current over time.

Electrolyte: 0.10 M $HClO_4$ aq.
Rotational frequency of RDE: 1,600 rpm
Current value: Current value at 0.9 V (vs. RHE) was normalized.

The reason for the use of perchloric acid as the electrolyte is as follows: since perchloric acid ions ($ClO_4^-$) are less prone to being adsorbed to metals, the influence of anion adsorption to metals can be ignored, and only the oxidation state of the platinum surface can be observed.

As a result of the measurement by the RDE method, no difference was found between the change in the oxygen reduction current over time of the core-shell catalyst and that of the platinum catalyst. Therefore, it can be said that there is no difference in the decline in oxygen reduction reaction rate due to the oxidation of the platinum surface between the core-shell catalyst and the platinum catalyst.

Meanwhile, concerning the factor (2), the inventors of the present invention measured a core-shell catalyst and a platinum catalyst by the RDE method in the following conditions and examined their changes in the oxygen reduction current over time.

Electrolyte: 0.05 M $H_2SO_4$ aq.
Rotational frequency of RDE: 1,600 rpm
Current value: Current value at 0.9 V (vs. RHE) was normalized.

Figure 4:
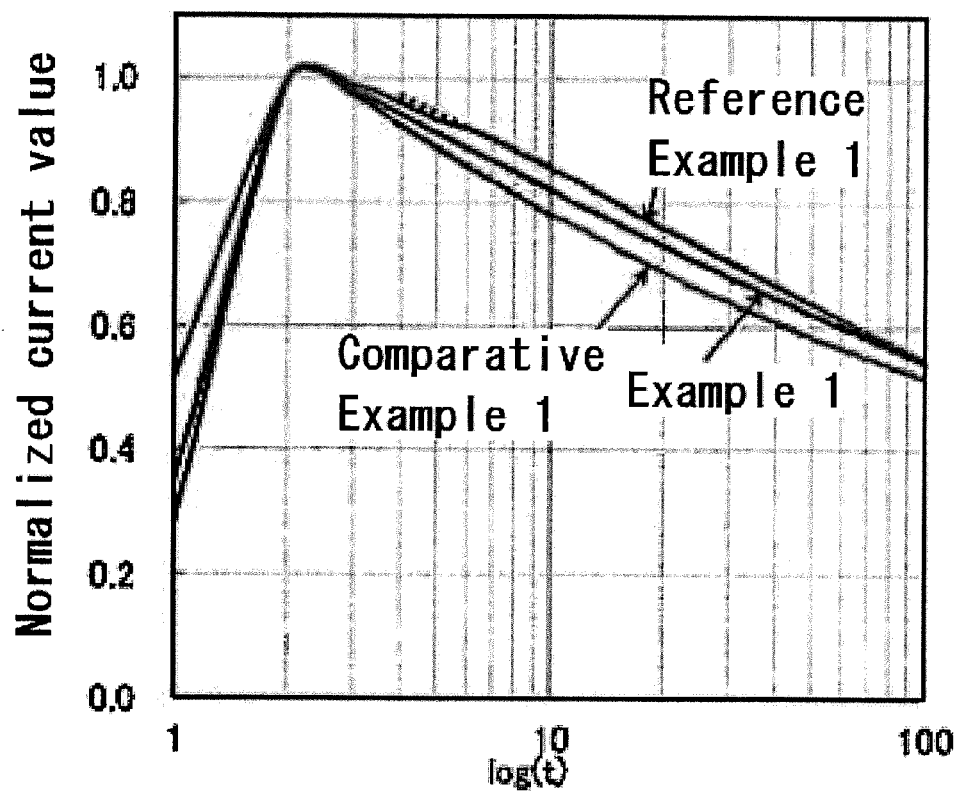
FIG. 4 is a graph showing changes over time in the oxygen reduction currents of the catalysts of Example 1, Comparative Example 1 and Reference Example 1 in 0.05 M sulfuric acid.

The measurement results are shown in FIG. 4. As is clear from FIG. 4, the oxygen reduction current of Comparative Example (the conventional core-shell catalyst) decreases faster than Reference Example 1 (the platinum catalyst). Therefore, it can be said that the decrease in the oxygen reduction reaction rate of the core-shell catalyst is larger than the platinum catalyst.

As just described, the reason for the large decrease in the oxygen reduction reaction rate of a core-shell catalyst than that of a platinum catalyst is supposed to be because palladium that is usually used in the core adsorbs more sulfonic acid ($R—SO_3H$) than platinum. When the shell of a core-shell catalyst has defects and the core (palladium) is thus exposed, it is expected that sulfonic acid adsorption is promoted and results in a serious decrease in the oxygen reduction reaction rate (reference: Jingxin, Z. et al., Abstract #1301, 224th ECS Meeting, 2013 The Electrochemical Society; B. Alvarez. et al., Phys. Chem. Chem. Phys., 2001, 3, 3269-3276).

In view of the circumstance that, as just described, conventional core-shell catalysts are inferior in practicality than platinum catalysts, the inventors of the present invention reconsidered the method for producing a core-shell catalyst carefully and found a problem with the platinum covering step after Cu-UPD.

As described above, Cu-UPD has been used to form the shell of a core-shell catalyst. However, in many cases, any potential control is not carried out in the platinum substitution step following Cu-UPD.

FIG. 6 is a schematic sectional view illustrating that the state of the fine palladium particle of being covered with copper is dependent on potential. As shown by a fine palladium particle in the top position of FIG. 6, the fine palladium particles shown in FIG. 6 have the following crystal surfaces: surface A, surface B and surface C. The surfaces A, B and C are determined to have different chemical properties relating to copper adsorption. That is, among the three crystal surfaces, the surface A is a crystal surface on which copper is most likely to be deposited and from which copper is least likely to be desorbed; the surface B is a crystal surface on which copper is the second most likely to be deposited and from which copper is the second least likely to be desorbed; and the surface C is a crystal surface on which copper is least likely to be deposited and from which copper is most likely to be desorbed.

FIG. 6 shows that the four fine palladium particles are each covered with or not covered with copper 21. Potentials applied to these fine palladium particles are different. That is, the highest potential is applied to the fine palladium particle in the top position of FIG. 6, and the second highest potential is applied to the fine palladium particle in the second top position of FIG. 6. The second lowest potential is applied to the fine palladium particle in the second position from the bottom in FIG. 6, and the lowest potential is applied to the fine palladium particle in the lowest position from the bottom.

As is clear from FIG. 6, no copper is deposited on the fine palladium particle to which the highest potential was applied. Meanwhile, in the case of the fine palladium particle to which the second highest potential was applied, the copper 21 is deposited only on the surface A. In the case of the fine palladium particle to which the second lowest potential was applied, the copper 21 is deposited on the surfaces A and B. In the case of the fine palladium particle to which the lowest potential was applied, the copper 21 is deposited on all of the crystal surfaces.

As just described, in Cu-UPD, copper is successively deposited from a crystal surface on which copper is likely to be deposited of a fine palladium particle, and the copper deposition state varies depending on the potential applied to the fine palladium particle. Therefore, to form a less defective shell, potential control is needed in not only Cu-UPD but also in the subsequent platinum covering step.

FIG. 7 is a graph of simulated changes in the self-potential of a fine palladium particle in a conventional platinum covering step. FIG. 7 has self-potential (V) on the vertical axis and time (t) on the horizontal axis. Below the horizontal axis, the schematic sectional views of the fine palladium particle are displayed according to time. In the schematic sectional views, circles of the same type indicate elements of the same type.

The schematic sectional view on the extreme left in FIG. 7 shows a fine palladium particle (a) after Cu-UPD and just before the start of the platinum covering step. All of the crystal surfaces are covered with the copper 21.

The schematic sectional view in the second position from the left in FIG. 7 shows a fine palladium particle (b) at the beginning of the platinum covering step. In a conventional production method, any particular limitation is imposed on potential, so that the potential of palladium increases as platinum is added. It indicates that the self-potential applied to the fine palladium particle slowly increases from the oxidation reduction potential of copper to the oxidation reduction potential of platinum. Platinum 22 is randomly substituted with the copper 21 deposited on the fine palladium particle (b). On the other hand, as the self-potential increases, the copper 21 is naturally and gradually oxidized on the surface C from which the copper 21 is likely to be desorbed. Since palladium is an electroconductive metal, if platinum comes close to the surface A, the fine palladium particle (b) becomes electroconductive and transfers electrons from the surface C to the surface A. As a result, the copper 21 on the surface C (not the copper 21 on the surface A) may be detached.

The schematic sectional view in the third position from the left in FIG. 7 shows a fine palladium particle (C) in the middle of the platinum covering step. While the platinum 22 is randomly substituted with the copper 21, the copper 21 is preferentially desorbed from the surface C of the fine palladium particle (c) as the potential increases. Therefore, all of the copper 21 on the surface C is consumed, and the platinum 22 and defective sites remain on the surface C. As the self-potential increases, the natural oxidation of the copper 21 starts also on the surface B from which the copper 21 is the second least likely to be desorbed.

The schematic sectional view on the extreme right in FIG. 7 shows a fine palladium particle (d) at the end of the platinum covering step. In the course of successive deposition of the platinum, the potential of the fine palladium particle (d) further increases. As a result, all of the copper 21 on the surface B is desorbed, and the platinum 22 and defective sites remain on the surface B.

As just described, since no potential control is carried out in the conventional production method, the copper is naturally oxidized and desorbed from the fine palladium particle surface. Therefore, the core-shell catalyst with the defective shell is produced.

Meanwhile, a prior art in which a potential sweep in a certain range is repeated in the platinum substitution step, is well-known.

Figure 8:
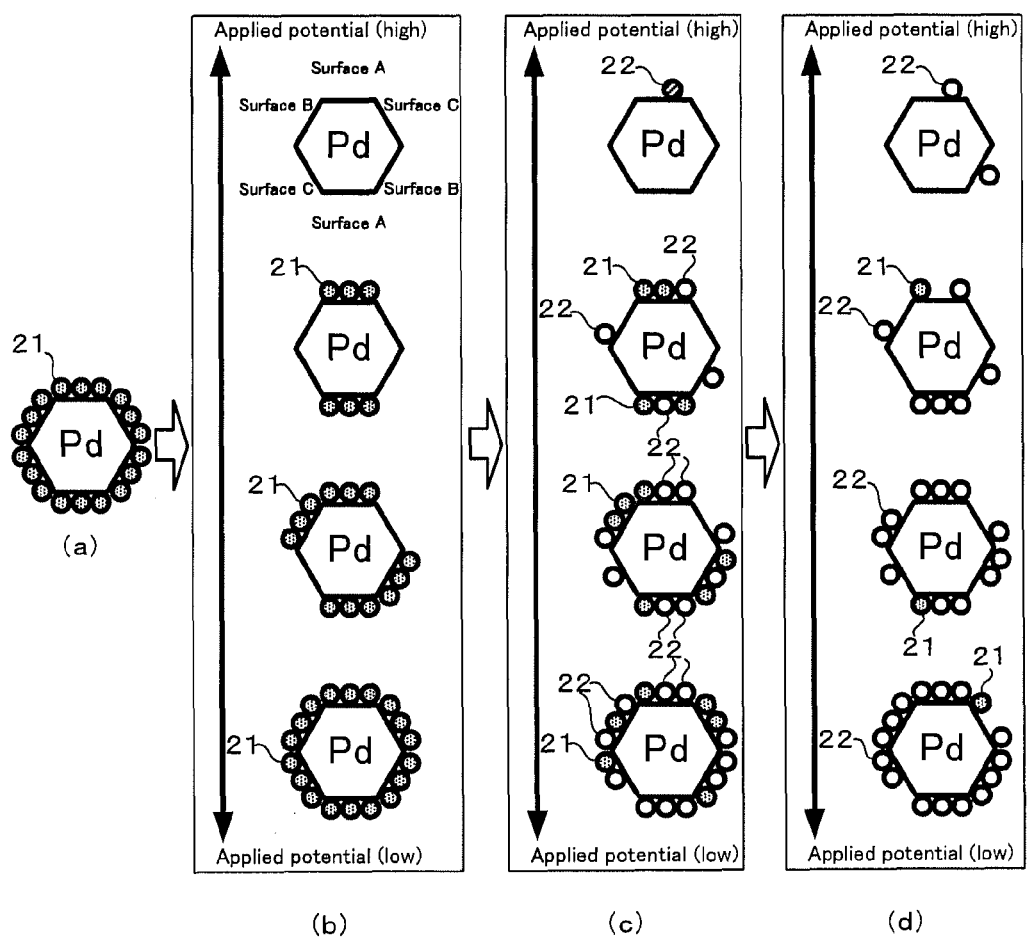
FIG. 8 is a view showing the schematic sectional views of the fine palladium particle subjected to the potential sweep in the platinum substitution step, which are arranged according to time.

FIG. 8 is a view showing the schematic sectional views of the fine palladium particle subjected to the potential sweep in the platinum substitution step, which are arranged according to time. In these schematic sectional views, circles of the same type indicate elements of the same type. Arrows between the schematic views indicate the passage of time.

The schematic sectional view on the extreme left in FIG. 8 shows the fine palladium particle (a) after the completion of Cu-UPD and just before the start of the platinum covering step. All of the crystal surfaces are covered with the copper 21.

A box (b) shown in FIG. 8 shows the fine palladium particles just after the start of the platinum covering step. The potential is swept in a certain range just after the start of the platinum covering step, and as shown in FIG. 6, the state of being covered with the copper 21 varies depending on the applied potential. Especially on the surface C, copper is less likely to be deposited and is likely to be desorbed therefrom. Therefore, once the copper is detached from the surface C, the possibility of copper redeposition on the surface C is low.

A box (c) shown in FIG. 8 shows the fine palladium particles in the middle of the platinum covering step. Since the potential always changes, the state of the fine palladium particle surface of being covered with the copper 21 varies at different times. Meanwhile, the platinum 22 is randomly substituted with the copper 21 deposited on the fine palladium particle surface. In the platinum covering step, generally, the platinum is added in a dropwise manner at a constant rate. When the platinum is added to the electrolyte, the fine palladium particle may be covered with the copper since the applied potential is low, or almost all of the copper may be desorbed from the fine palladium particle surface since the applied potential is high. As just described, the platinum is kept added in a dropwise manner, while the copper deposition state on the fine palladium particle surface changes over time. Therefore, uniform substitution of the copper 21 with the platinum 22 does not occur. Since the substitution of the copper 21 with the platinum 22 occurs when the time at which the copper 21 remains on the fine palladium particle surface according to the potential applied to the particle, is the same as the time at which the platinum comes close to the copper 21. Therefore, the platinum 22 is less likely to be deposited uniformly on the fine palladium particle surface. Also, as described above, since the copper is likely to remain on the fine palladium particle surface in the order of the surface A, the surface B and the surface C, platinum deposition appears prominently on the surface A.

A box (d) shown in FIG. 8 shows the fine palladium particles at the end of the platinum covering step. As shown in the box (d), the deposition of the platinum 22 on the fine palladium particle surface varies among the fine palladium particles. Moreover, even if the fine palladium particles are separately observed, while the platinum 22 is preferentially deposited on the surface A, many defects are found on the surface B, and the platinum is sparsely deposited on the surface C.

As just described, in the embodiment in which the potential is swept in the platinum covering step, such an advantage of the shell formation using Cu-UPD cannot be utilized, that copper can be substituted with platinum at a ratio of 1:1.

The inventors of the present invention made research studies on the device of decreasing the defects of the platinum-containing outermost layer, based on the above considerations of potential shown in FIGS. 6 to 8 and the fact that the adsorption of sulfonic acid (including sulfuric acid) to the catalyst can be prevented by decreasing the palladium exposed on the fine palladium-containing particle surface. As a result, the inventors found the following: by applying a constant potential to the fine palladium-containing particles in the platinum covering step, the substitution of the copper with the platinum is secured, without any natural oxidation of the copper even on the fine palladium-containing particle surface, from which the copper is likely to be desorbed; therefore, a platinum-containing outermost layer with less defects than ever before can be formed and, as a result, adsorption of sulfuric acid ions to the thus-obtained fine catalyst particle is inhibited, and a decrease in catalytic activity in the presence of sulfonic acid including sulfuric acid, is inhibited. Based on this finding, they achieved the present invention.

FIG. 1 is a flow chart of an example of the fine catalyst particle production method of the present invention.

The fine catalyst particle production method shown in FIG. 1 includes (1) the potential applying step, (2) the copper covering step, (3) the platinum covering step, (4) a washing step, (5) an acid treatment step and (6) a drying step.

The fine catalyst particle production method of the present invention includes (2) the copper covering step and (3) the platinum covering step. As needed, it includes (1) the potential applying step before the copper covering step, and it includes (4) a washing step, (5) an acid treatment step, (6) a drying step, etc., after the platinum covering step.

Hereinafter, these steps will be described in order.

(1) Potential Applying Step

The potential applying step is a step of removing palladium oxides (impurities) from the surface of the fine palladium-containing particles, before the copper covering step. By the potential applying step, the fine palladium-containing particles can be uniformly covered with the platinum-containing outermost layer.

For example, the potential applying step can be carried out by applying a predetermined potential to the fine palladium-containing particles in an acid solution containing the fine palladium-containing particles.

In the present invention, "fine palladium-containing particle" is a general term for fine palladium particle and fine palladium alloy particle.

As will be described below, the outermost layer covering the fine palladium-containing particle contains platinum. Platinum is excellent in catalytic activity, especially in oxygen reduction reaction (ORR) activity. While the lattice constant of platinum is 3.92 Å, the lattice constant of palladium is 3.89 Å, and this is a value that is within a range of 5% either side of the lattice constant of platinum. Accordingly, no lattice mismatch occurs between platinum and palladium, and palladium is sufficiently covered with platinum.

In the present invention, from the viewpoint of cost reduction, it is preferable that the fine palladium-containing particles contain a metal material that is less expensive than the below-described material which is used for the platinum-containing outermost layer. It is more preferable that the fine palladium-containing particles contain a metal material which is able to impart electroconductivity.

In the present invention, from the above viewpoint, it is preferable that the fine palladium-containing particles are fine palladium particles or particles of an alloy of palladium and a metal such as cobalt, iridium, rhodium or gold. In the case of using palladium alloy particles, the palladium alloy particles can contain palladium and only one kind of metal, or they can contain palladium and two more kinds of metals.

The average particle diameter of the fine palladium-containing particles is not particularly limited, as long as it is equal to or less than the average particle diameter of the below-described fine catalyst particles. The average particle diameter of the fine palladium-containing particles is preferably 30 nm or less, and more preferably 5 to 10 nm, from the point of view that the ratio of surface area to cost per fine palladium-containing particle is high.

In the present invention, the average particle diameter of the fine palladium-containing particles, the fine catalyst particles and the carbon-supported catalyst is calculated by a conventional method. An example of the method for calculating the average particle diameter of the fine palladium-containing particles, the fine catalyst particles and the carbon-supported catalyst is as follows. First, for a particle shown in a TEM image at a magnification of 400,000 to 1,000,000×, the particle diameter is calculated, on the assumption that the particle is spherical. Such a particle diameter calculation by TEM observation is carried out on 200 to 500 particles of the same type, and the average of the particles is regarded as the average particle diameter.

In the case of producing the carbon-supported catalyst in which the fine catalyst particles are supported on a carbon support, it is preferable that fine palladium-containing particles supported on a carbon support are used in this step. By the use of the carbon support, when the carbon-supported catalyst is used in the electrocatalyst layer of a fuel cell, electroconductivity can be provided to the electrocatalyst layer.

Concrete examples of carbonaceous materials that can be used as the carbon support include electroconductive carbonaceous materials including carbon fibers and carbon particles such as Ketjen Black (product name; manufactured by: Ketjen Black International Company), Vulcan (product name; manufactured by: Cabot), Norit (product name; manufactured by: Norit), Black Pearls (product name; manufactured by: Cabot), Acetylene Black (product name; manufactured by: Chevron) and OSB (product name; manufactured by: Denka Co., Ltd.)

The acid solution is used in the potential applying step. The acid solution is not particularly limited, as long as it is a solution that is able to, by an appropriate potential sweep in the acid solution, remove palladium oxide and impurities from the fine palladium-containing particle surface.

As the acid solution used in the potential applying step, more specifically, an acid solution that is similar to an acid solution that can be used in the below-described copper-containing solution, can be used.

In the case of carrying out the potential applying step and the below-described copper covering step in the same reaction container, the copper-containing solution can be added to the electrolyte used in the potential applying step. For example, when sulfuric acid is used as the electrolyte of the potential applying step, a copper sulfate aqueous solution can be added to the used sulfuric acid and used in the copper covering step.

From the viewpoint of removing oxygen as much as possible from the acid solution and promoting quick oxide removal, it is preferable to bubble nitrogen into the acid solution.

The first dispersion comprising the fine palladium-containing particles being dispersed in the acid solution, may be a dispersion prepared in advance or a commercially-available product. In the case of preparing the first dispersion, the preparation method can be a well-known method.

In the potential applying step, the temperature inside a reaction system is not particularly limited. When the potential applying step, the copper covering step and the platinum covering step are carried out in the same reaction container, from the viewpoint of quickly adjusting the temperature inside the reaction system in the platinum covering step to −3° C. or more and 10° C. or less, it is preferable to keep the temperature at −3° C. or more and 10° C. or less. In the present invention, "inside the reaction system" is a concept that encompasses regions used for reactions (such as reaction container and device) and gasses, liquids and solids stored in the regions.

The method for applying the potential to the fine palladium-containing particles and the potential control device can be the same as those used in the below-described copper covering step.

The method for applying the potential to the fine palladium-containing particles in the first dispersion is not particularly limited, and it can be a general method. For example, it may be a method of immersing a working electrode, a counter electrode and a reference electrode in the first dispersion and then applying the potential to the working electrode.

As the working electrode, for example, a material that can ensure electroconductivity can be used, such as metal materials including titanium, a platinum mesh, a platinum plate and a gold plate, and electroconductive carbonaceous materials including glassy carbon and a carbon plate. Also, the reaction container can be formed with the electroconductive material and used as the working electrode. When the reaction container made of a metal material is used as the working electrode, it is preferable that the inner wall of the reaction container is coated with $RuO_2$, from the viewpoint of preventing corrosion. When the reaction container made of a carbonaceous material is used as the working electrode, the container can be used as it is without any coating.

As the counter electrode, for example, a platinum black-plated platinum mesh or electroconductive carbon fibers can be used.

As the reference electrode, for example, a reversible hydrogen electrode (RHE), a silver-silver chloride electrode or a silver-silver chloride-potassium chloride electrode can be used.

As the potential control device, for example, a potentiostat or a potentio-galvanostat can be used.

Figure 2:
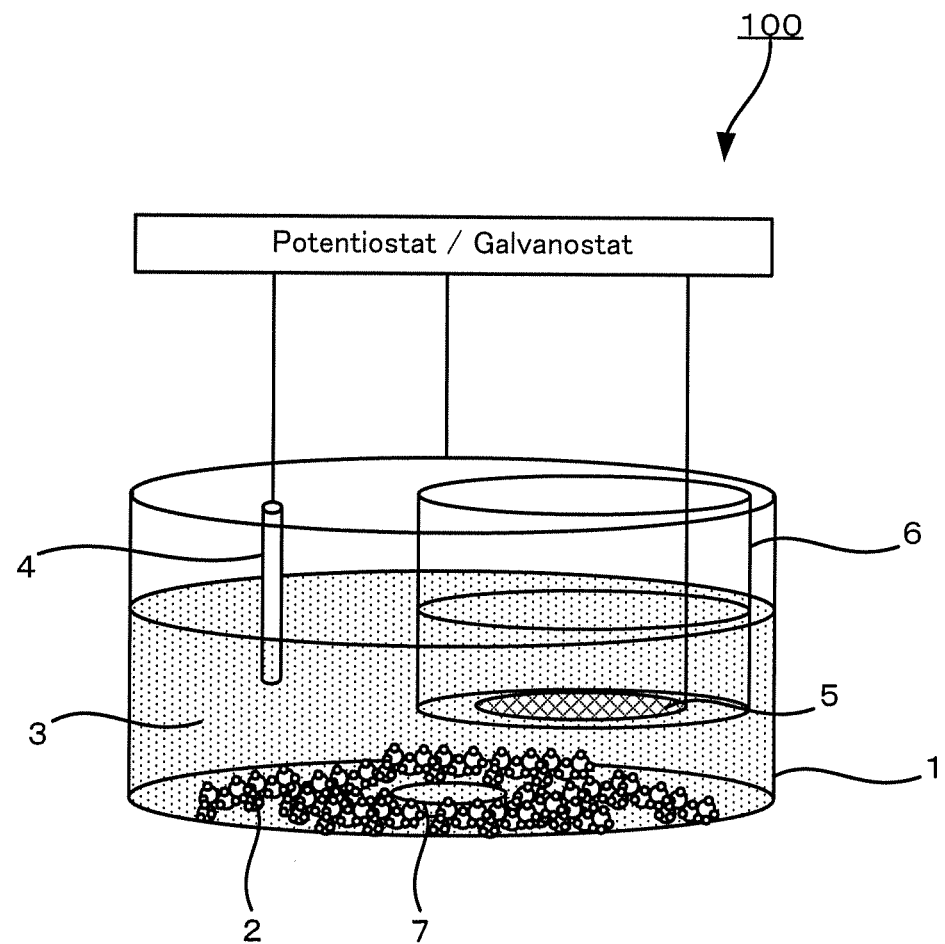
FIG. 2 is a schematic perspective view of an example of an electrochemical device used to carry out the potential applying step.

FIG. 2 is a schematic perspective view of an example of the electrochemical device used to carry out the potential applying step.

An electrochemical device 100 shown in FIG. 2 includes a reaction container 1, a reference electrode 4, a counter electrode 5, a compartment 6 for counter electrode, and a stirrer bar 7.

The reaction container 1 is made of graphite and also functions as a working electrode. An acid solution 3 is contained in the reaction container 1, the solution containing a palladium-supported carbon 2 (hereinafter may be referred to as Pd/C) in which palladium particles are supported on a carbon support. In the reaction container 1, the acid solution 3 containing the Pd/C 2 can be stirred with the stirrer bar 7.

The reference electrode 4 and the counter electrode 5 are placed so that they are fully immersed in the acid solution 3. The reaction container 1, which functions as a working electrode, the reference electrode 4 and the counter electrode 5 are electrically connected to the potentiostat/galvanostat so as to be able to control the potential of the working electrode. To prevent the Pd/C 2 in the acid solution 3 from contact with the counter electrode 5, the counter electrode 5 is immersed in the acid solution 3 in the state of being stored in the compartment 6 for counter electrode, the compartment being made of glass. The bottom of the compartment 6 for counter electrode is made of a porous fritted glass to ensure contact between the counter electrode 5 and the acid solution 3.

First, with dispersing the Pd/C 2 by stirring the acid solution 3 with the stirrer bar 7, from a nitrogen supply source (not shown) placed outside the reaction container, nitrogen is bubbled into the acid solution 3 for a certain amount of time to saturate the acid solution 3 with nitrogen.

Then, from a hydrogen supply source (not shown) placed outside the reaction container, hydrogen is bubbled into the acid solution 3 for a certain amount of time to saturate the acid solution 3 with hydrogen.

Then, from the nitrogen supply source, nitrogen is bubbled into the acid solution 3 again for a certain amount of time to saturate the acid solution 3 with nitrogen.

Then, the potential of the reaction container 1 (working electrode) is swept by the potentiostat/galvanostat to apply a certain potential to the Pd/C 2 brought into contact with the surface of the reaction container 1, thereby removing oxides on the surface of the palladium particles. An example of the conditions of the potential applying step is shown below.

Electrolyte: 0.05 mol/L $H_2SO_4$ aq (subjected to inert gas bubbling)

Atmosphere: In inert gas atmosphere

Sweep rate: 50 mV/sec

Potential sweep range: −0.05 V to 1.2 V (vs. RHE)

Reference electrode: Reversible hydrogen electrode (RHE)

(2) Copper Covering Step

The copper covering step is a step of covering at least part of the fine palladium-containing particle with copper by preparing a second dispersion by mixing the first dispersion described above with a copper-containing solution, and applying a potential that is nobler than the oxidation reduction potential of copper to the fine palladium-containing particles in the second dispersion.

The copper-containing solution is not particularly limited, as long as it is a solution in which copper can be deposited on the surface of the fine palladium-containing particles by Cu-UPD. In the copper-containing solution, the copper may be present in the form of ions or a copper compound such as a copper complex. The copper-containing solution is generally composed of a solvent in which a predetermined amount of copper salt is dissolved. However, it is not limited to this constitution and may be a solution in which copper or a part or all of ions thereof are separately present.

As the solvent used for the copper-containing solution, examples include water and organic solvents. Water is preferred from the point of view that it does not prevent the deposition of copper on the surface of the fine palladium-containing particles.

As the copper salt used for the copper-containing solution, examples include copper sulfate, copper nitrate, copper chloride, copper chlorite, copper perchlorate and copper oxalate.

The copper concentration of the copper-containing solution is not particularly limited and is preferably 10 to 1000 mM.

In addition to the solvent and the copper salt, the copper-containing solution can contain an acid, for example. As the acid that can be added to the copper-containing solution, examples include sulfuric acid, nitric acid, hydrochloric acid, chlorous acid, perchloric acid and oxalic acid. Counter anions in the copper-containing solution and counter anions in the acid may be the same kind or different kinds of counter anions.

It is also preferable to bubble an inert gas into the copper-containing solution in advance. This is because the fine palladium-containing particles can be inhibited from oxidation and can be uniformly covered with the platinum-containing outermost layer. As the inert gas, nitrogen gas, argon gas or the like can be used.

The method for applying the potential to the fine palladium-containing particles in the second dispersion, is not particularly limited and can be a general method. Examples include the following method: the second dispersion is prepared by adding the copper-containing solution in the reaction container 1 of the electrochemical device 100 shown in FIG. 2, with stirring the acid solution 3 by the stirrer bar 7; thereafter, by applying the potential to the reaction container 1, copper is deposited on the surface of the palladium particles of the Pd/C 2 brought into contact with the surface of the reaction container 1.

The applied potential is not particularly limited, as long as it is a potential that can deposit copper on the surface of the fine palladium-containing particles, that is, a potential that is nobler than the oxidation reduction potential of copper. For example, the applied potential is preferably in a range of from 0.35 to 0.7 V (vs. RHE) and particularly preferably 0.4 V (vs. RHE). As used herein, the "potential that is nobler than the oxidation reduction potential of copper" means a potential that is in a more oxidizing direction than the oxidation reduction potential of copper.

The potential applying time is not particularly limited. It is preferable to apply the potential for 60 minutes or more, and it is more preferable to apply the potential until reaction current becomes steady and close to zero.

The potential can be applied by a potential sweep in a range that includes the above potential range. More specifically, the potential sweep range is preferably from 0.3 to 0.8 V (vs. RHE).

The number of the potential sweep cycles is not particularly limited and is preferably 1 to 10,000 cycles. The potential sweep rate is 0.01 to 100 mV/sec, for example.

From the viewpoint of preventing the oxidation of the surface of the fine palladium-containing particles and preventing the oxidation of the copper, it is preferable to carry out the copper covering step in an inert gas atmosphere such as nitrogen atmosphere.

Also in the copper covering step, it is preferable to appropriately stir the second dispersion, as needed. For example, in the case where, like the device shown in FIG. 2, the reaction container that functions as the working electrode is used and the fine palladium-containing particles are dispersed in the second dispersion in the reaction container, the fine palladium-containing particles can be brought into contact with the surface of the reaction container (working electrode) by stirring the second dispersion, and thus a uniform potential can be applied to the fine palladium-containing particles. In this case, the stirring can be carried out continuously or intermittently in the copper covering step.

In the copper covering step, the temperature inside the reaction system is not particularly limited. When the copper covering step and the below-described platinum covering step are carried out in the same reaction container, from the viewpoint of quickly adjusting the temperature inside the reaction system in the platinum covering step to −3° C. or more and 10° C. or less, it is preferable to keep the temperature at −3° C. or more and 10° C. or less.

(3) Platinum Covering Step

The platinum covering step is a step of covering at least part of the fine palladium-containing particle with platinum by substituting the copper covering at least part of the fine palladium-containing particle with platinum by mixing the second dispersion and a platinum-containing solution after the copper covering step, with applying a constant potential that is in a range between a potential that is nobler than the oxidation reduction potential of copper and a potential that is less than the oxidation reduction potential of platinum, to the fine palladium-containing particles.

A main characteristic of the present invention is to apply the constant potential in the platinum covering step. As shown in FIG. 7, a conventional core-shell catalyst production method has such a problem that, since the self-potential increases at the time of platinum substitution, copper is naturally oxidized and results in a difficulty in forming a non-defective shell. However, the following effect is obtained by the present invention: by applying the potential in the platinum covering step, the copper can be forced to remain on the fine palladium-containing particle surface until the substitution of the copper with the platinum is completed, so that an effect of assisting the substitution of the copper with the platinum and promoting the deposition of the platinum is obtained. In other words, by carrying out copper electroplating in parallel with displacement plating of the copper with the platinum, copper monoatomic layers can be sequentially formed on the fine palladium-containing particle and, at the same time, the substitution reaction with the platinum can be promoted.

The potential applied in this step is a constant potential that is in a range between a potential that is nobler than the oxidation reduction potential of copper and a potential that is less than the oxidation reduction potential of platinum. As used herein, the oxidation reduction potential of copper has a certain range when, like the present invention, the UPD method is used. In particular, it is 0.4 to 0.75 V (vs. RHE). The oxidation reduction potential of platinum is 0.98 to 1.12 V (vs. RHE). As used herein, the "potential that is less than the oxidation reduction potential of platinum" means a potential that is in a more reducing direction than the oxidation reduction potential of platinum.

It is preferable that the potential applied in this step is closer to the oxidation reduction potential of copper. In particular, it is preferably a constant potential that is in a range of from 0.37 to 0.70 V (vs. RHE), and it is more preferably a constant potential that is in a range of from 0.37 to 0.50 V (vs. RHE).

Figure 3:
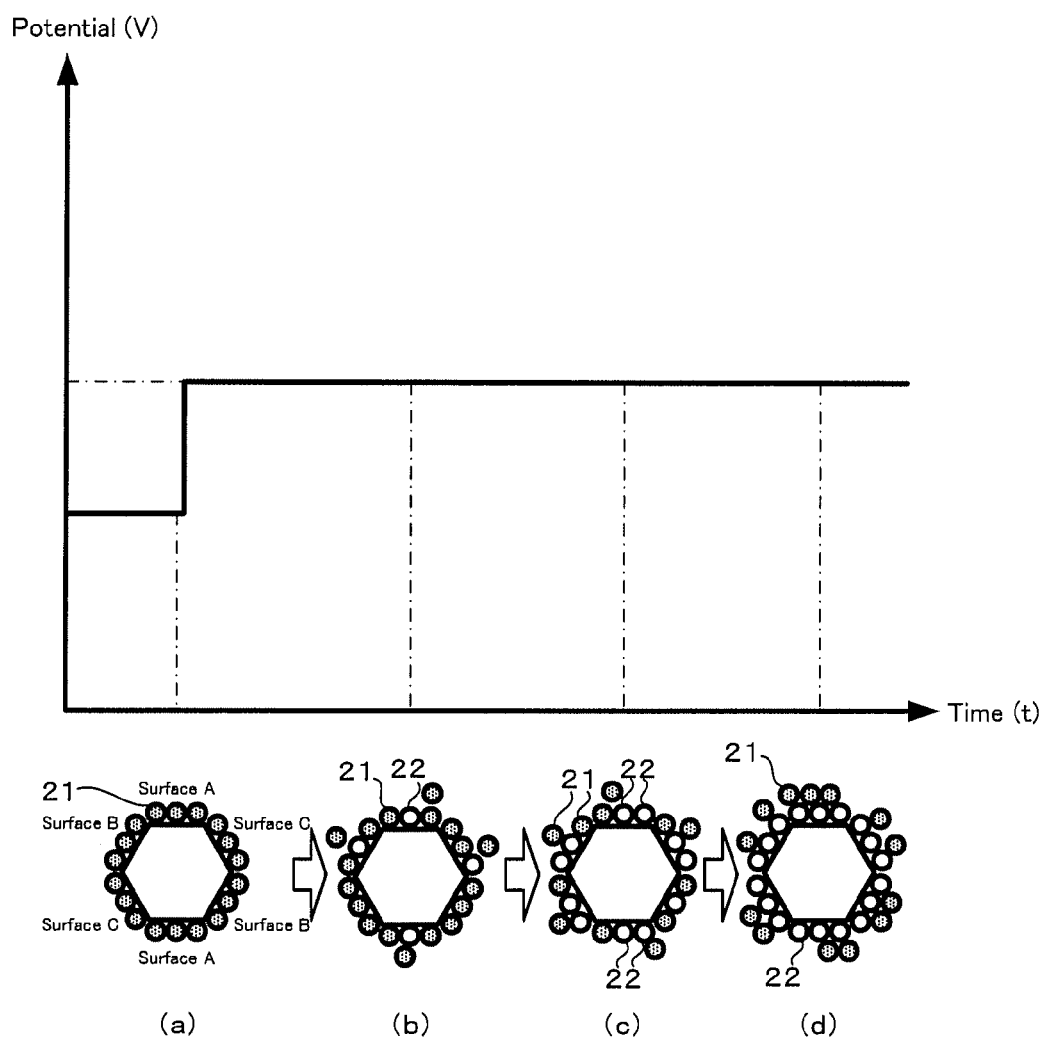
FIG. 3 is a graph showing an embodiment of the potential control of the fine palladium-containing particle in the platinum covering step.

FIG. 3 is a graph showing an embodiment of the potential control of the fine palladium-containing particle in the platinum covering step. FIG. 3 has potential (V) on the vertical axis and time (t) on the horizontal axis. Below the horizontal axis, the schematic sectional views of the fine palladium-containing particle are displayed according to time. In the schematic sectional views, hexagons indicate the fine palladium-containing particle, and circles of the same type indicates elements of the same type. The present invention is not limited to the embodiment shown in FIG. 3.

The schematic sectional view on the extreme left in FIG. 3 shows a fine palladium-containing particle (a) after Cu-UPD and just before the start of the platinum covering step. All of the crystal surfaces are covered with the copper 21.

The schematic sectional view in the second position from the left in FIG. 3 shows a fine palladium-containing particle (b) at the beginning of the platinum covering step. In the production method of the present invention, the potential is controlled to be constant, so that there is no increase in the potential of the palladium even when the platinum is added. Unlike the above-described case of FIG. 7, the copper 21 is not naturally oxidized even on the surface C from which the copper 21 is likely to be desorbed.

The schematic sectional view in the third position from the left in FIG. 3 shows a fine palladium-containing particle (c) in the middle of the platinum covering step. The platinum is randomly substituted with the copper 21 to deposit the copper 21 on the platinum 22. Unlike the above-described case of FIG. 7, the copper 21 is not naturally oxidized even on the surface B.

The schematic sectional view on the extreme right in FIG. 3 shows a fine palladium-containing particle (d) at the end of the platinum covering step. Even in the course of successive deposition of the platinum, the potential applied to the fine palladium-containing particle (d) is constant; therefore, a non-defective platinum-containing outermost layer is formed. The copper 21 deposited on the platinum 22 is desorbed from the fine palladium-containing particle by being naturally oxidized when it is exposed to the air.

As just described, as a result of carrying out the potential control in the platinum covering step, the copper is not naturally oxidized and desorbed from the fine palladium-containing particle surface; therefore, a fine catalyst particle with a non-defective platinum-containing outermost layer is produced.

In the fine catalyst particle with the non-defective platinum-containing outermost layer, the fine palladium-containing particle serving as the core is not exposed on the surface. Since the palladium that is likely to adsorb sulfonic acid (including sulfuric acid) is not exposed, sulfuric acid ions are less likely to be adsorbed to the fine catalyst particle. Therefore, a decrease in the oxygen reduction reaction rate of the fine catalyst particle is inhibited even in a fuel cell environment, and the fine catalyst particle can exert the desired activity.

In the platinum covering step, the temperature inside the reaction system is preferably kept at −3° C. or more and 10° C. or less. From the viewpoint of forming a uniform shell on the surface of the fine palladium-containing particles, the temperature is more preferably kept at 3° C. or more and 9° C. or less, and particularly preferably 5° C. or more and 8° C. or less. When the temperature is less than −3° C., the solution is frozen and no reaction may proceed. When the temperature is more than 10° C., sufficient platinum mass activity may not be obtained.

The method for keeping the temperature inside the reaction system is not particularly limited. For example, it may be a method that uses a circulation cooling device (chiller), a cooling tube, or the like.

The platinum-containing solution is not particularly limited, as long as it contains at least platinum ions and a reaction inhibitor. In the platinum-containing solution, the platinum may be in the form of ions or a platinum compound such as a platinum complex.

The reaction inhibitor is not particularly limited, as long as it can inhibit a substitution reaction between the copper and the platinum. As the reaction inhibitor, examples include a complex forming agent that forms a complex with the platinum, the copper deposited on the fine palladium-containing particle surface, and the palladium exposed on the fine palladium-containing particle surface, in the solution.

As the complex forming agent, examples include citric acid, sodium salt of citric acid, potassium salt of citric acid, ethylenediaminetetraacetic acid (hereinafter may be referred to as EDTA), sodium salt of EDTA, and potassium salt of EDTA. Preferred is citric acid. These complex forming agents can be used alone or in combination of two or more kinds. In the solution, these complex forming agents form a complex with the platinum and the copper; therefore, the substitution reaction between the copper and the platinum is inhibited and, as a result, the fine palladium-containing particle surface can be uniformly covered with the platinum-containing shell.

The concentration of the reaction inhibitor in the platinum-containing solution is not particularly limited and is preferably 1 to 10 times higher than the platinum ion concentration.

A platinum salt is used for the platinum-containing solution. Examples of the platinum salt include $K_2PtCl_4$ and $K_2PtCl_6$. Also, an ammonia complex such as ($[PtCl_4][Pt(NH_3)_4]$) can be used.

The platinum ion concentration of the platinum-containing solution is not particularly limited and is preferably 0.01 to 100 mM.

A solvent is used for the platinum-containing solution. The solvent can be the same as the solvent used for the copper-containing solution described above.

In addition to the solvent, the reaction inhibitor and the platinum salt, the platinum-containing solution can also contain an acid, etc. The acid can be the same as the acid used for the copper-containing solution described above.

The platinum-containing solution can contain platinum only, or it can also contain iridium, ruthenium, rhodium or gold, in addition to platinum. In the case of using a metal other than platinum for the platinum-containing solution, the platinum-containing solution can contain platinum and only one kind of metal, or it can contain platinum and two or more kinds of metals.

From the viewpoint of keeping the temperature inside the reaction system at −3° C. or more and 10° C. or less, it is preferable to adjust the temperature of the platinum-containing solution to −3° C. or more and 10° C. or less in advance. Also, the platinum-containing solution is sufficiently stirred, and from the viewpoint of preventing the oxidation of the surface of the fine palladium-containing particles or preventing the oxidation of the copper, it is preferable to bubble nitrogen into the solution in advance.

The substitution time (contact time between the platinum-containing solution and the fine palladium-containing particles) is not particularly limited and is preferably 10 minutes or more.

The method for bringing the copper deposited on the surface of the fine palladium-containing particles into contact with the platinum-containing solution is not particularly limited. When the copper covering step and the platinum covering step are carried out in the same reaction container, the platinum-containing solution can be added to the copper-containing solution used in the copper covering step. For example, in the case of using the electrochemical device 100 shown in FIG. 2, it is allowed that after the copper covering step, while the potential of the reaction container 1 is controlled to a constant potential that is in a range of from 0.37 to 0.70 V (vs. RHE), the platinum-containing solution is gradually added in the reaction container 1, with stirring the acid solution 3 with the stirrer bar 7, thereby bringing the fine palladium-containing particles on which copper is deposited into contact with the platinum-containing solution.

It is preferable that the platinum-containing outermost layer formed by this step has high catalytic activity. As used herein, "catalytic activity" refers to the activity which is required of a fuel cell catalyst, especially oxygen reduction reaction (ORR) activity.

(4) Washing Step

The washing step is a step of washing, with water, the fine palladium-containing particles subjected to the substitution of the copper with the platinum, after the platinum covering step. From the viewpoint of eluting the reaction inhibitor physically adsorbed to the support surface, the washing step is preferably carried out before the acid treatment step.

In the washing step, the water can be cold water or warm water. Or, cold water and warm water can be used in combination for washing. More specifically, the fine palladium-containing particles can be washed with cold water at less than 30° C. and then washed with warm water.

The temperature of the warm water is preferably 30° C. or more and 100° C. or less, from the viewpoint of eluting the reaction inhibitor physically adsorbed to the support surface.

The washing step is preferably a step of washing the fine palladium-containing particles by dispersing them in water, preferably in warm water. The method for dispersing the fine palladium-containing particles in water is not particularly limited. For example, it may be an ultrasonic dispersion method, a method for pulverizing the particles with a ball mill and then adding them to water, or a method for dispersing the particles with a device that uses shear force, such as a nanomizer. Of them, the ultrasonic dispersion method is preferably used, from the viewpoint of relatively less damage to the structure of the fine palladium-containing particles.

It is preferable to repeat the washing step until the conductivity of the water used for washing (hereinafter may be referred to as washing water) reaches 10 μS/cm or less. This is because the amount of the reaction inhibitor physically adsorbed to the support surface is determined to be still large, when the conductivity of the washing water is high. In particular, the washing water refers to supernatant water obtained by adding the fine palladium-containing particles to water (10 g per liter of water) in a container and dispersing them.

(5) Acid Treatment Step

The acid treatment step is a step of bringing an acid solution into contact with the fine palladium-containing particles subjected to the substitution of the copper with the platinum, after the platinum covering step. By the acid treatment, the fine palladium-containing particles exposed are selectively eluted, so that the fine palladium-containing particles become smaller. Therefore, the defective sites of the platinum-containing outermost layer are mended, so that the platinum mass activity of the fine catalyst particles can be increased.

As the acid solution, examples include nitric acid, sulfuric acid, perchloric acid, hydrochloric acid and hypochlorous acid. Of them, nitric acid is preferred because it is highly acidic.

The concentration of the acid solution is as follows: for example, in the case of using nitric acid as the acid solution, the nitric acid concentration is preferably $1.0 \times 10^{-4}$ to 2 mol/L, more preferably $1.0 \times 10^{-3}$ to 1 mol/L, and still more preferably $1.0 \times 10^{-2}$ to $1.0 \times 10^{-1}$ mol/L.

In the case of using sulfuric acid as the acid solution, the sulfuric acid concentration is preferably $1.0 \times 10^{-4}$ to 2 mol/L, more preferably $1.0 \times 10^{-3}$ to 1 mol/L, and still more preferably $1.0 \times 10^{-2}$ to $1.0 \times 10^{-1}$ mol/L.

The temperature of the acid solution is preferably 40° C. or more, particularly preferably 50° C. or more, since the defective sites of the platinum-containing outermost layer can be effectively and efficiently mended. Also, the temperature of the acid solution is preferably 90° C. or less, particularly preferably 80° C. or less, from the viewpoint of preventing the fine palladium-containing particles from aggregation, etc.

The time of contact between the fine palladium-containing particles and the acid solution can be appropriately adjusted, depending on the type, concentration, temperature, etc., of the acid solution. For example, it can be about 30 minutes to 2 hours.

The method for bringing the fine palladium-containing particles into contact with the acid solution is not particularly limited. From the viewpoint of allowing the acid treatment to sufficiently proceed, a method for immersing the fine palladium-containing particles in the acid solution is preferred. At the time of immersing the fine palladium-containing particles in the acid solution, it is preferable to stir the acid solution and disperse the particles with an ultrasonic homogenizer, a magnetic stirrer, a motor with stirring blades, etc.

(6) Drying Step

The drying step is a step of drying the carbon-supported catalyst obtained after the platinum covering step.

The method for drying the carbon-supported catalyst is not particularly limited, as long as it is a method that can remove the solvent, etc. For example, it may be such a drying method that a temperature of 50 to 100° C. is kept for 6 to 12 hours in an inert gas atmosphere.

As needed, the carbon-supported catalyst can be pulverized. The pulverizing method is not particularly limited, as long as it is a method that can pulverize solids. Examples of the pulverization include pulverization using a mortar or the like in an inert gas atmosphere or in the air, and mechanical milling using a ball mill, turbo mill or the like.

The fine catalyst particles obtained by the present invention is preferably for use in fuel cells. From the viewpoint of excellent oxygen reduction activity, the fine catalyst particles obtained by the present invention is preferably used in electrodes for fuel cells, and more preferably in cathode electrodes for fuel cells.

In the fine catalyst particles obtained by the present invention, from the point of view that the elution of the fine palladium-containing particles can be more inhibited, the coverage of the fine palladium-containing particle with the platinum-containing outermost layer is generally 0.5 to 2, and preferably 0.8 to 1. When the coverage of the fine palladium-containing particle with the platinum-containing outermost layer is less than 0.5, the fine palladium-containing particles are eluted in an electrochemical reaction and, as a result, the fine catalyst particles may deteriorate.

As used herein, "coverage of the fine palladium-containing particle with the platinum-containing outermost layer" means the proportion of the area of the fine palladium-containing particle covered with the platinum-containing outermost layer, on the assumption that the total surface area of the fine palladium-containing particle is 1. The case where the coverage is more than 1 and less than 2 means such a state that at least part of the fine palladium-containing particle surface is covered with two platinum-containing outermost layers. The case where the coverage is 2 means such a state that the fine palladium-containing particle is absolutely covered with two platinum-containing outermost layers. An example of the method for calculating the coverage is as follows. First, an outermost layer metal content (A) in the fine catalyst particle is measured by inductively coupled plasma mass spectrometry (ICP-MS), etc. Meanwhile, the average particle diameter of the fine catalyst particles is measured with a transmission electron microscope (TEM), etc. From the average particle diameter thus measured, the number of atoms on the surface of a particle having the same diameter is estimated, and an outermost layer metal content (B) in the case where one atomic layer on the particle surface is substituted with the metal contained in the platinum-containing outermost layer, is estimated. The value obtained by dividing the outermost layer metal content (A) by the outermost layer metal content (B) is the "coverage of the fine palladium-containing particle with the platinum-containing outermost layer".

The platinum-containing outermost layer covering the fine palladium-containing particle is preferably a monoatomic layer. The fine catalyst particle having such a structure is advantageous in that, compared to a fine catalyst particle having a platinum-containing outermost layer that is composed of two or more atomic layers, the catalytic performance of the platinum-containing outermost layer is much higher and, since the amount of the platinum-containing outermost layer covering the fine palladium-containing particle is small, the material cost is lower.

The lower limit of the average particle diameter of the fine catalyst particles is preferably 2.5 nm or more, and more preferably 3 nm or more. The upper limit is preferably 40 nm or less, and more preferably 10 nm or less.

EXAMPLES

Hereinafter, the present invention will be described in more detail, by way of examples and comparative examples. However, the present invention is not limited to these examples.

1. Production of Carbon-Supported Catalyst

1-1. Potential Applying Step

Example 1

First, 5 g of a 30 wt % Pd-supported carbon powder (hereinafter may be referred to as Pd/C) was put in a reaction container 1 (made of graphite) of an electrochemical device 100 shown in FIG. 2. Then, 1.0 L of a 0.05 M sulfuric acid aqueous solution was further added thereto, thereby preparing a first dispersion. As shown in FIG. 2, a reference electrode 4 and a counter electrode 6 in the reaction container 1 was placed so that they are fully immersed in the first dispersion.

The electrochemical device 100 was moved to the inside of a glove box. The first dispersion was subjected to inert gas ($N_2$ gas) bubbling at a flow rate of 50 cc/min for 30 minutes, thereby deoxidizing the first dispersion.

Then, as shown in FIG. 2, the reaction container 1 (working electrode), the reference electrode 4 and the counter electrode 6 were connected to a potentiostat. To the working electrode (the reaction container 1) of the electrochemical device 100, a potential in a potential range of from 0.05 to 1.20 V (vs. RHE) was applied for 800 cycles at a sweep rate of 100 mV/s in triangle waveform, thereby sufficiently cleaning the fine palladium particle surface and the carbon support surface.

1-2. Copper Covering Step (Cu-UPD)

Using the electrochemical device 100 shown in FIG. 2, with bubbling nitrogen into the first dispersion in the reaction container 1, a copper-containing solution obtained by dissolving 30 g of a copper sulfate pentahydrate in 100 mL of 0.05 M sulfuric acid, was added in the reaction container 1 to prepare a second dispersion. By fixing the potential of the working electrode (the reaction container 1) at 0.40 V (vs. RHE), the potential was applied to fine palladium particles in the second dispersion to deposit the copper on the fine palladium particles.

1-3. Platinum Covering Step

With keeping the potential at 0.40 V (vs. RHE), a platinum-containing solution obtained by dissolving 2.4 g of $K_2PtCl_4$ and 9 g of a citric acid monohydrate in 200 mL of 0.05 M sulfuric acid, was added in the reaction container 1 for about 80 minutes. A suspension thus obtained was stirred for 3 hours, thereby substituting the copper with the platinum. At this time, the temperature of the suspension was cooled to 10° C. or less.

1-4. Post-Treatment

The suspension was filtered to collect a carbon-supported catalyst. The carbon-supported catalyst was washed, dried and then pulverized by use of an agate mortar and a pestle, thereby producing the carbon-supported catalyst of Example 1.

Comparative Example 1

The carbon-supported catalyst of Comparative Example 1 was produced in the same manner as Example 1, except that the potential control was not carried out in the platinum covering step.

2. Catalytic Activity Evaluation of Carbon-Supported Catalysts

For the carbon-supported catalysts of Example 1 and Comparative Example 1 and a platinum-supported carbon (hereinafter may be referred to as "catalyst of Reference Example 1"), their changes in oxygen reduction current over time in 0.05 M sulfuric acid were examined by the rotating disk electrode method (the RDE method). The details of the measurement conditions and the evaluation method are as follows.

Electrolyte: 0.05 M $H_2SO_4$ aq.
Rotational frequency of RDE: 1,600 rpm
Current value: Current value at 0.9 V (vs. RHE) was normalized.

Figure 5:
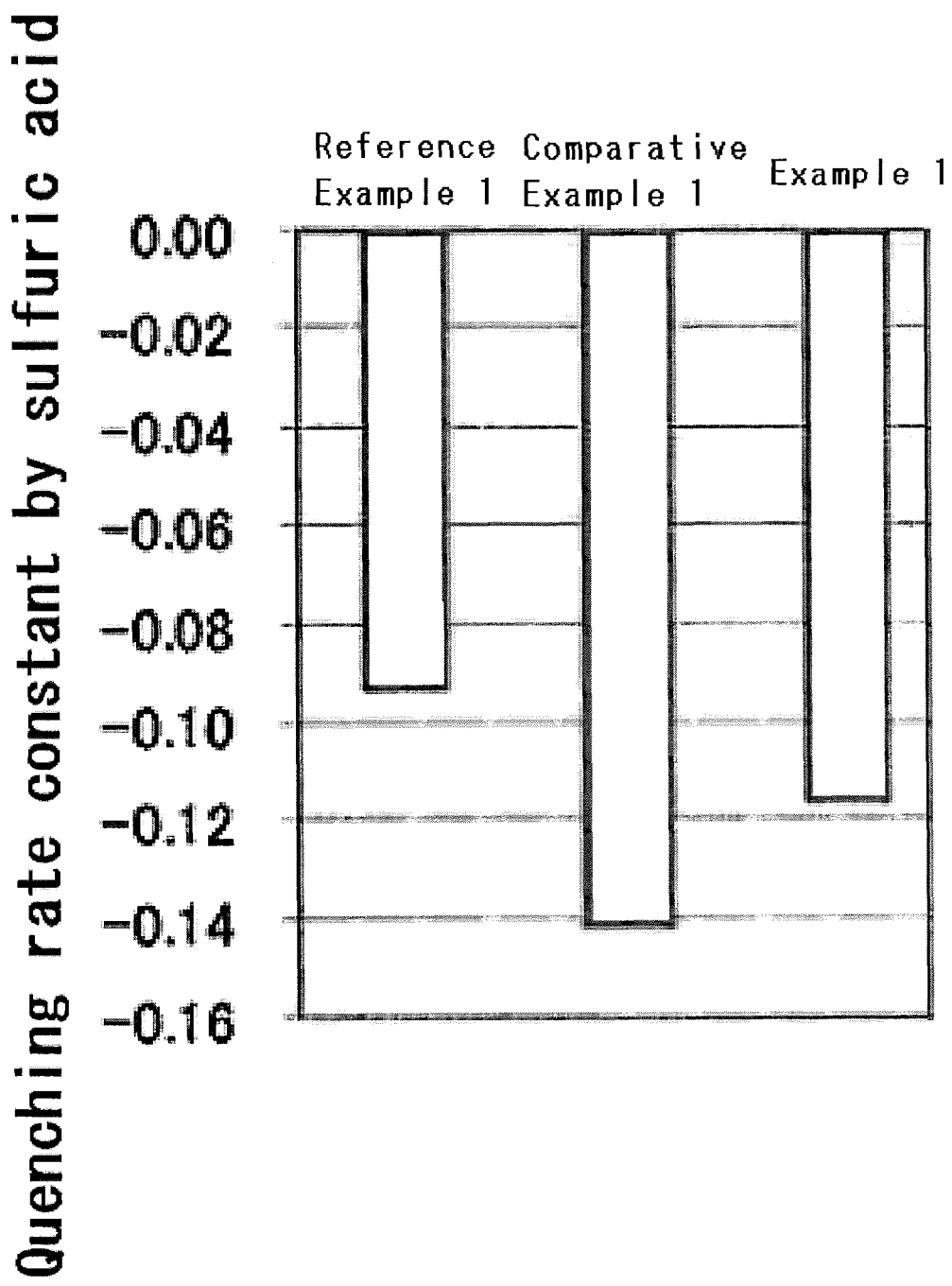
FIG. 5 is a bar chart comparing the quenching rate constants of Example 1, Comparative Example 1 and Reference Example 1, which are due to sulfuric acid.

FIG. 4 is a graph showing changes over time in the oxygen reduction currents of the catalysts of Example 1, Comparative Example 1 and Reference Example 1 in 0.05 M sulfuric acid. FIG. 4 is a graph with the current value normalized by the maximum current value on the vertical axis and the log of time (log(t)) on the horizontal axis. FIG. 5 is a bar chart comparing the quenching rate constants of Example 1, Comparative Example 1 and Reference Example 1, which are due to sulfuric acid. As used herein, the quenching rate constant means a slope between 4 second to 10 second in the graph of FIG. 4. The relationship between current value "i", time "t" and quenching rate constant "a" in FIG. 4 is as shown in the following formula (1).

$$i = a \log(t) + c \qquad \text{Formula (1)}$$

(In the formula (1), c is an intercept.)

As is clear from FIG. 4, the oxygen reduction current decrease rate of Comparative Example 1 is the highest; that of Example 1 is the second highest; and that of Reference Example 1 is the lowest. As is clear from FIG. 5, while the quenching rate constant of Comparative Example 1 is −0.141, that of Example 1 is −0.115. The quenching rate constant of Reference Example 1 is −0.093, so that when the quenching rate constant of Reference Example 1 is determined as 1, the quenching rate constant of Example 1 is 1.24, while the quenching rate constant of Comparative Example 1 is 1.52.

Therefore, when the quenching rate constant of Reference Example 1 is determined as 1, the quenching rate constant of Example 1 is 18% lower than that of Comparative Example 1. As just described, it was proved that by controlling the potential so as to be constant in the platinum covering step, no palladium is exposed on the fine catalyst particle surface and, as a result, catalyst deactivation due to sulfuric acid ions is less likely to occur.

REFERENCE SIGNS LIST

1. Reaction container
2. Carbon-supported palladium (Pd/C)
3. Acid solution
4. Reference electrode
5. Counter electrode
6. Compartment for counter electrode
7. Stirrer bar
21. Copper atom or copper ion
22. Platinum atom
100. Electrochemical device

The invention claimed is:

1. A method for producing fine catalyst particles comprising a fine palladium-containing particle and a platinum-containing outermost layer covering at least part of the fine palladium-containing particle,
   wherein the method comprises:
      a copper covering step of covering at least part of the fine palladium-containing particle with copper by preparing a second dispersion by mixing a first dispersion comprising fine palladium-containing particles being dispersed in an acid solution with a copper-containing solution, and applying a potential that is nobler than the oxidation reduction potential of copper to the fine palladium-containing particles in the second dispersion, and
      a platinum covering step of covering at least part of the fine palladium-containing particle with platinum by substituting the copper covering at least part of the fine palladium-containing particle with platinum by mixing the second dispersion and a platinum-containing solution after the copper covering step, with applying a constant potential that is in a range between a potential that is nobler than the oxidation reduction potential of copper and a potential that is less than the oxidation reduction potential of platinum, to the fine palladium-containing particles.

2. The method for producing the fine catalyst particles according to claim 1, wherein, the second dispersion and the platinum-containing solution are mixed in the platinum covering step, with applying a constant potential that is in a range of from 0.37 to 0.70 V (vs. RHE) to the fine palladium-containing particles.

3. A method for producing a carbon-supported catalyst in which the fine catalyst particles produced by the method of claim 1 are supported on a carbon support,
   wherein fine palladium-containing particles configured for use in the copper covering step are supported on a carbon support.

* * * * *